Figures 1, 3:
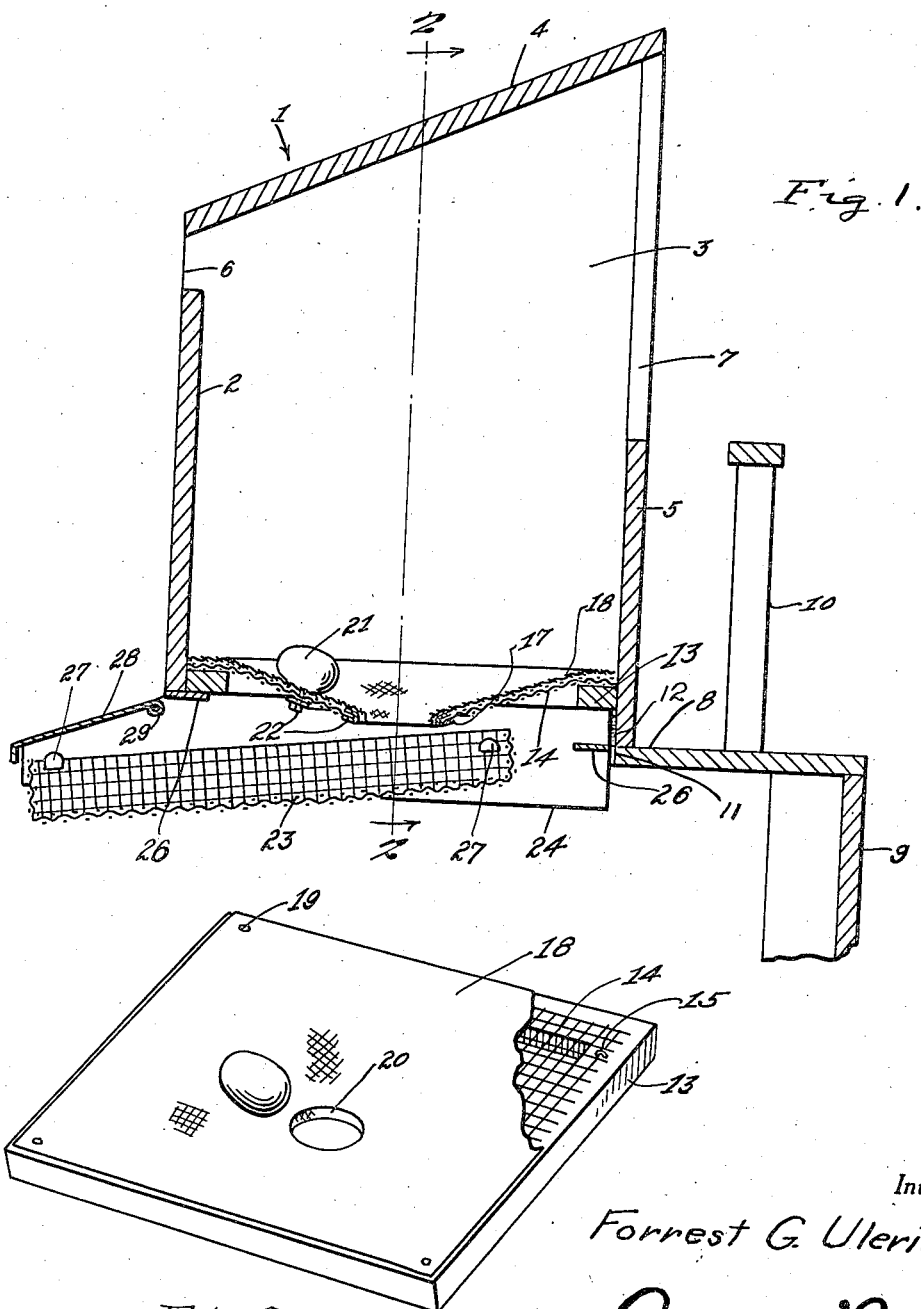

Aug. 19, 1941.　　　F. G. ULERICK　　　2,253,451
HEN'S NEST
Filed Aug. 16, 1940　　　2 Sheets-Sheet 1

Inventor
Forrest G. Ulerick
By Clarence A. O'Brien
Attorneys

Aug. 19, 1941.  F. G. ULERICK  2,253,451
HEN'S NEST
Filed Aug. 16, 1940  2 Sheets-Sheet 2
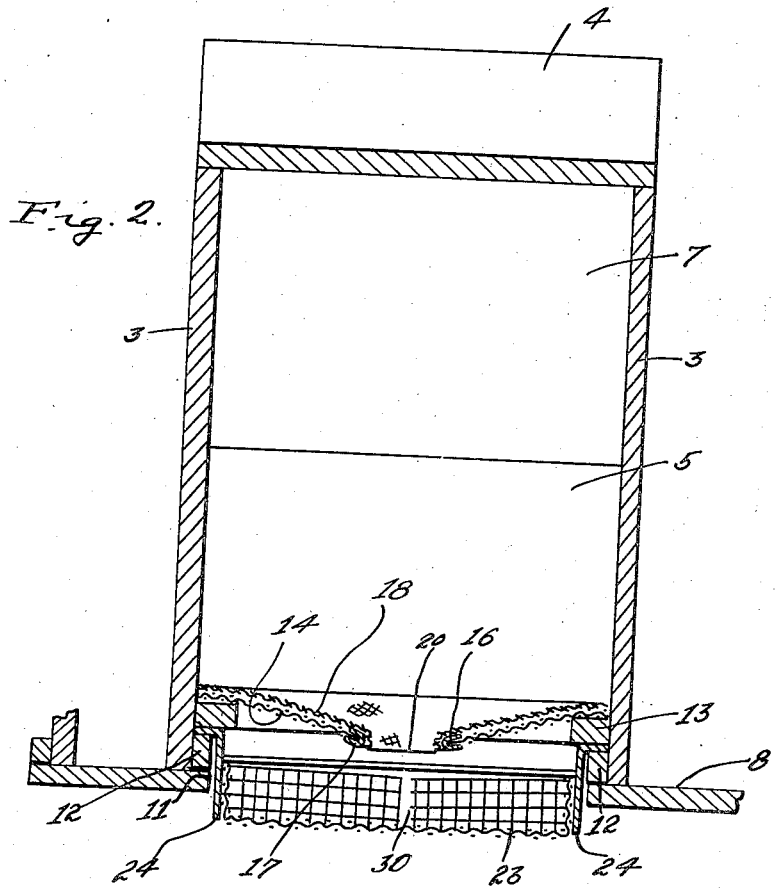
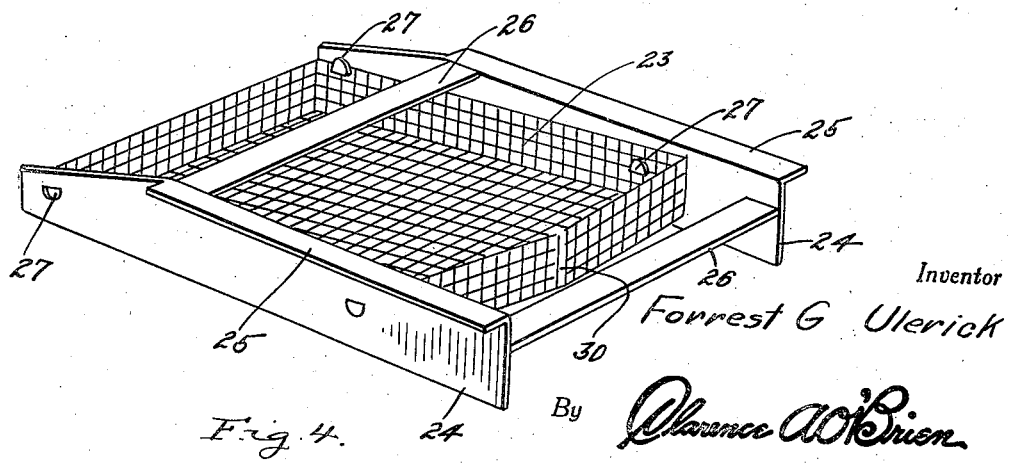
Inventor
Forrest G. Ulerick
By Clarence A. O'Brien
Attorneys Patented Aug. 19, 1941

2,253,451

UNITED STATES PATENT OFFICE 2,253,451

HEN'S NEST

Forrest G. Ulerick, Twelve Mile, Ind.

Application August 16, 1940, Serial No. 352,968

5 Claims. (Cl. 119—48)

My invention relates to improvements in hens' nests for poultry houses and the like.

Among the objects in view are to provide a simply constructed device of this character which may be quickly and easily installed in any poultry house, and which obviates breakage of eggs, and eating of eggs by hens, protects the eggs until gathered, is easily kept clean, prevents the eggs from becoming soiled, and provides for temporary storage of large numbers of eggs.

To the accomplishment of the above, and subordinate objects presently appearing, a preferred embodiment of my invention has been illustrated in the accompanying drawings, set forth in detail in the succeeding description, and defined in the claims appended hereto.

In said drawings:

Figure 1 is a view in vertical transverse section of the preferred embodiment of my invention, Figure 2 is a view in vertical section taken on the line 2—2 of Figure 1, Figure 3 is a view in perspective of the nesting bottom partly broken away, and Figure 4 is a view in perspective of the egg receiving tray and slide frame therefor.

Referring to the drawings by numerals, the nest of my invention comprises a box-like laying stall 1, preferably of wood, having a front wall 2, side walls 3, a downwardly and forwardly sloping top 4, and a rear wall 5. The front wall 2 terminates short of the top to provide an air inlet opening 6, in the front of the stall. The rear wall 5 is cut down to provide a rear doorway 7 to the stall. The walls 2, 3, and 5 are suitably secured on top of a shelf-like support 8 extending rearwardly of the rear wall 5 for a suitable distance so that it may be detachably secured, by any suitable means, to the upper edge of a vertical partition wall 9 of the poultry house. A suitable perch 10 is provided on the extension of said support 8 at substantially the level of the bottom of the doorway 7. The support 8 beneath the stall 1 is cut out from the front of the stall to the rear wall, as at 11, to provide an open bottom for the stall. A pair of side ledges 12 are provided in the bottom of the stall extending along the side walls 3 and forming guides for a purpose presently seen.

A nesting bottom is provided in the bottom of the stall 1 comprising a rectangular frame 13 of wood fitting against the walls 2, 3 and 5. A rectangular piece of so-called hardware cloth 14 fitting over the frame 13 is secured thereto at its corners by staples 15 and provided with a central aperture 16 of the requisite size to permit eggs to drop therethrough. The aperture 16 is bound around the edge thereof with a band 17 of galvanized steel suitably secured thereto. A rectangular piece of burlap 18 of the same size as the cloth 14 is tacked to the frame 13, as at 19, over the cloth 14 and provided with a central aperture 20 of the same size as the aperture 16 registering with the latter. The cloth 14 and burlap 18 are arranged to sag so as to form a concave nesting support for the hens.

An artificial egg 21 having a flat bottom is secured to the burlap 18 adjacent the aperture 20, preferably at the side thereof opposite the door 7 and by means of a bolt 22 extended through said burlap and the cloth 14.

Below the described nesting bottom is a wire mesh, rectangular, egg receiving basket 23 of flat bottom form secured in downwardly and forwardly inclined position to extend from below the aperture 16 with its front end wall forward of the front wall 2 of the stall 1. The basket 23 is suspended in a slide frame comprising a pair of side rails 24 having longitudinal upper edge flanges 25 slidably mounted on the ledges 12 and being connected together by a pair of rear and intermediate cross bars 26. The side rails 24 support the frame 13 of the nesting bottom. The basket 23 is detachably secured to the bars 24 by lugs 27 struck up from said bars and hooked into the mesh of the sides of the basket. The front end portion of the basket 23 is covered by a metal flap 28 hinged, as at 29, to the side bars 24.

The manner in which the described nest functions will be readily understood. The eggs laid on the nesting bottom drop through the same into the basket 23 to roll down the bottom of the latter to the front end of the basket for collection therefrom, access being had to the eggs by lifting the flap 28. The basket 23 may be removed, if desired, by sliding the frame bars 24 outwardly on the ledges 12, as for instance, for cleaning, or use in another nest. The nesting bottom may be removed through the open bottom of the stall 1 for cleaning or replacement and the entire nest may be detached from the wall 9 for attachment in another location in the poultry house.

The basket 23 may be provided with a vertically split rear end, as at 30, so that it will sag in the center to guide the eggs away from the sides of the basket and thereby prevent them from rolling unduly in the basket.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claims.

What I claim is—

1. A hen's nest comprising a shelf-like support to be attached to a wall in laterally extending position and having an outer edge recess therein, a box-like stall surmounting said support over said recess and opening at its bottom into the latter, a doorway in said stall, a concave laying bottom in the lower part of said stall detachably mounted therein and having a central aperture forming a drop for eggs laid on said bottom, and an egg receiving tray slidably mounted on said support below said bottom.

2. A hen's nest comprising a shelf-like support to be attached to a wall in laterally extending position and having an outer edge recess therein, a box-like stall surmounting said support over said recess and opening at its bottom into the latter, a doorway in said stall, a concave laying bottom in the lower part of said stall detachably mounted therein and having a central aperture forming a drop for eggs laid on said bottom, and an egg receiving tray slidably mounted on said support below said bottom, said bottom comprising a frame, a covering of reticulated material secured at its edges to the frame, and a sheet of cloth secured over said covering.

3. A hen's nest comprising a shelf-like support to be attached to a wall in laterally extending position and having an outer edge recess therein, a box-like stall surmounting said support over said recess and opening at its bottom into the latter, a doorway in said stall, a concave laying bottom in the lower part of said stall detachably mounted therein and having a central aperture forming a drop for eggs laid on said bottom, and an egg receiving tray slidably mounted on said support below said bottom, said tray comprising a pair of side bars, and a wire mesh rectangular basket secured to said bars between the same and having an end extending beyond one side of said support and stall for access to said basket.

4. A hen's nest comprising a shelf-like support to be attached to a wall in laterally extending position and having an outer edge recess therein, a box-like stall surmounting said support over said recess and opening at its bottom into the latter, a doorway in said stall, a concave laying bottom in the lower part of said stall detachably mounted therein and having a central aperture forming a drop for eggs laid on said bottom, and an egg receiving tray slidably mounted on said support below said bottom, said tray comprising a pair of side bars, and a wire mesh rectangular basket secured to said bars between the same and having an end extending beyond one side of said support and stall for access to said basket, said basket being inclined toward its extending end to provide for gravitation of eggs therein toward said end.

5. A hen's nest comprising a shelf-like support to be attached to a wall in laterally extending position and having an outer edge recess therein, a box-like stall surmounting said support over said recess and opening at its bottom into the latter, a doorway in said stall, a concave laying bottom in the lower part of said stall detachably mounted therein and having a central aperture forming a drop for eggs laid on said bottom, and an egg receiving tray slidably mounted on said support below said bottom, said tray comprising a pair of side bars, and a wire mesh rectangular basket secured to said bars between the same and having an end extending beyond one side of said support and stall for access to said basket, said tray being provided with a hinged cover for said extending end.

FORREST G. ULERICK.